United States Patent
Haan et al.

(10) Patent No.: US 7,456,944 B2
(45) Date of Patent: Nov. 25, 2008

(54) APPARATUS AND METHOD FOR DETECTION OF OPTICAL SYSTEMS IN A TERRAIN AREA

(75) Inventors: Hubertus Haan, Neresheim (DE); Gunther Kuerbitz, Koenigsbronn (DE); Herbert Schmidt, Huettlingen (DE)

(73) Assignee: Carl Zeiss Optronics GmbH (DE)

( * ) Notice: Subject to any disclaimer, the term of this patent is extended or adjusted under 35 U.S.C. 154(b) by 0 days.

(21) Appl. No.: 11/690,155

(22) Filed: Mar. 23, 2007

(65) Prior Publication Data

US 2007/0222970 A1 Sep. 27, 2007

(30) Foreign Application Priority Data

Mar. 23, 2006 (DE) .................. 10 2006 013 340

(51) Int. Cl.
*G01B 11/26* (2006.01)
(52) U.S. Cl. ................ 356/152.3; 356/152.1; 356/152.2
(58) Field of Classification Search ... 356/152.1–152.3, 356/3.01–3.15, 4.01–4.1, 5.01–5.15, 6–22
See application file for complete search history.

(56) References Cited

U.S. PATENT DOCUMENTS

| | | | | |
|---|---|---|---|---|
| 5,910,767 A | * | 6/1999 | Frucht | 340/557 |
| 5,990,767 A | * | 11/1999 | Ivanov et al. | 333/219.1 |
| 6,057,915 A | | 5/2000 | Squire et al. | |
| 6,603,134 B1 | | 8/2003 | Wild et al. | |
| 2006/0228003 A1 | * | 10/2006 | Silverstein | 382/115 |

FOREIGN PATENT DOCUMENTS

| DE | 10 2005 006 726 A1 | 8/2006 |
|---|---|---|
| EP | 1 515 162 A1 | 3/2005 |
| FR | 2505505 A | 11/1982 |
| FR | 2535466 A | 5/1984 |
| FR | 2736731 A | 1/1997 |
| WO | 03/102626 A1 | 12/2003 |

OTHER PUBLICATIONS

J. Sarazan, "Cilas SLD-400 Tracking Down Snipers," Planet Aerospace [online] Nr. 1-2, 2005, XP002481435; URL: http://www.planet-aerospace.com/pas/content/0F00000200000057/0/07/40743070.pdf; May 20, 2008.

* cited by examiner

*Primary Examiner*—Thomas H Tarcza
*Assistant Examiner*—Luke D Ratcliffe
(74) *Attorney, Agent, or Firm*—GrayRobinson, PA

(57) ABSTRACT

An apparatus for detection of optical systems in a terrain area, has at least:

a laser arrangement with a laser light source, a moving mirror for scanning the terrain area and a photoelement for detection of retroreflected laser radiation from the laser light source, a scan position sensor for detection of a scanning direction, and a controller for determination of the position of an optical system to be detected, from a measurement which is carried out by means of the laser arrangement by evaluation of the intensity of retroreflected laser radiation from an optical surface of the optical system, and evaluation of the associated scanning direction detected by the scan position sensor, with the controller having an electronic interface via which information relating at least to the intensity and the elevation of the detected retroreflected laser radiation can be transmitted to at least one display apparatus.

19 Claims, 1 Drawing Sheet

APPARATUS AND METHOD FOR DETECTION OF OPTICAL SYSTEMS IN A TERRAIN AREA

FIELD OF THE INVENTION

The invention relates to an apparatus and a method for detection of optical systems in a terrain area.

BACKGROUND OF THE INVENTION

Appliances for the detection of sharp shooter or snipers are known, which are based on the so-called cat's eye effect, with retroreflected light from the optical appliances or systems of the gunners being detected. If the optical system is a telescopic sight, the radiation is reflected, for example, from the reticle, in the same direction from which the illuminating radiation came. A laser beam at an appropriate wavelength is generally used for active illumination of the optics to be detected, for this purpose. Visual light is generally not used for illumination since, on the one hand, eye safety with laser light in the visual band is not ensured and, on the other hand, the visual light can itself be easily detected. Inter alia, optics such as telescopic sights, telescopes, periscopes or thermal imagers, can be recorded. Two technical solutions are essentially known in this case.

1. The transmitted laser beam is detected using a camera which is sensitive for radiation in the appropriate wavelength range of the laser. This is generally the SWIR band, so that an SWIR camera is likewise used in order to record the retroreflection of the laser. Cameras such as these record only the retroreflection of the laser, and not the entire surrounding area, however, when it is dark. External illumination is therefore required, as well as a further camera (for example a thermal imager) to make the surrounding area visible. The user is therefore displayed a superimposition of the images of the two cameras.
2. In the case of purely optical systems, the display is provided just by illumination of a light-emitting diode, which appears aligned with the target to be detected.

WO 03/102626 A discloses an apparatus for identification of optical and optoelectronic objects. The apparatus uses a laser light source with a light outlet which is widened one-dimensionally in the vertical direction and is aimed at a target area. A row of detectors arranged vertically one above the other receives the light reflected from the target area. Furthermore, a telescope-like optical observation system is provided.

The prior DE 10 2005 006 726, which was not published prior to this, discloses a method and an apparatus for detection of optical systems, for example of gunners in a terrain area. The terrain area is optically scanned by means of a moving mirror, and the position of the gunner is determined from a measurement, which is carried out by means of a laser arrangement, and is displayed visually. The position of the gunner is determined directly from the measurement (which is carried out by means of the laser arrangement) by evaluation of the intensity of a laser beam, which is reflected from an optical surface of the gunner, of the laser arrangement, and is injected into a telescope. The apparatus has a laser arrangement containing a moving mirror, a controller for determination of the position of the gunner, as well as an apparatus for visual display of the position. In this case, the visual display apparatus is a telescope, and means are provided for injection of the position of the gunner into the telescope.

SUMMARY OF THE INVENTION

The present invention is based on the object of improving an apparatus and a method of the type mentioned initially. One particular aim is to provide an apparatus and a method which allow an optical system, in particular a gunner, to be located using an autonomous appliance, even before he can fire, and allow this data to be made available in a convenient form to an operator.

With regard to the apparatus, this object is achieved by the features stated in claim 1.

With regard to the method, the object is achieved by the features stated in claim 13.

The measures according to the invention provide an autonomous apparatus and scanning unit for detection of optical systems in a terrain area, in a simple and advantageous manner. This scanning unit can make the determined position data of a recorded optical system available via an interface to further appliances or display apparatuses or cameras, by which means the position can be superimposed directly on an image of the terrain area on a display apparatus which receives the position data from the interface. In this case, information relating at least to the intensity and the elevation of the recorded retroreflected laser radiation is transmitted. A scan position sensor is provided for this purpose. The use of a laser arrangement makes it possible to scan the terrain area to be checked for the presence of optical systems with little energy being consumed, since all that is necessary is to pass a laser beam in the form of a dot over the terrain area.

The advantages relating to the method according to the invention are analogous and are evident from the description.

It is particularly advantageous for the apparatus to be electrically connected via the electronic interface to a digital camera for recording of the terrain area, which digital camera has the display apparatus, with the field of view of the apparatus and the field of view of the camera at least approximately coinciding, and in which case the information relating to the intensity and the elevation of the recorded retroreflected laser radiation from the optical system to be detected can be electronically superimposed on the image on the digital camera.

Any desired digital camera, in particular a low-cost digital camera, can be used to observe the surrounding area. This does not need to use the same wavelength as that of the laser arrangement. The retroreflection, frequently also referred to as "Glint", can be electronically superimposed on any desired camera image. The scanning unit should scan within the field of view of the digital camera.

The apparatus according to the invention for detection of optical systems in a terrain area, and the digital camera, should have a fixed relationship to one another. For this purpose, in one advantageous refinement of the invention, the camera can be mechanically connected, in particular firmly connected, to the apparatus.

Alternatively, it would be feasible for the relative position of the appliances with respect to one another—including with respect to the azimuth direction—to be known to at least one of the two appliances. Correspondingly extended position data, in particular also including the azimuth of the optical system to be detected, is also transmitted, in which case appropriate processing must be provided for the extended position data.

In a further preferred embodiment of the apparatus according to the invention, the mirror is an oscillating mirror which can be scanned about an oscillation axis, in particular by means of an oscillating drive.

This measure has the advantage that the relatively small elevation range that is required for the present purposes, for example of 6° to 10°, can be scanned through in a simple manner.

It is advantageous for the oscillation axis of the oscillating mirror to be a horizontal axis, in particular when the apparatus is in the in-use position, and to have the capability for the apparatus to be scanned horizontally, in particular through 360°, in the in-use position.

This allows the terrain area to be scanned to be checked quickly and easily via the operator of the system and/or of the apparatus, for example, manually carrying out an appropriate horizontal scan. Alternatively or additionally, the apparatus can be combined with an automatic scanning device, which can scan horizontally through 360°. In one advantageous refinement of the method according to the invention, the laser arrangement, the scan position sensor and the display apparatus for scanning of the terrain area can then be scanned synchronously in an appropriate manner on a horizontal plane.

Furthermore, an alarm signal can be emitted when a potential optical system or an optoelectronic system, in particular a sniper, is detected during continuous horizontal scanning of the terrain area with a decision on whether the displayed image is an actual threat or just a false alarm, for example caused by a reflection on a road sign or the like, being made and being stored in a database. If the same surrounding area is scanned repeatedly, it is then particularly advantageously possible to suppress another possible false alarm, based on a comparison with the database. In this case, it is advantageous for the apparatus to be electrically connected to a computer, as the display apparatus, without the use of wires.

Advantageous refinements and developments of the invention are specified in the other dependent claims. One exemplary embodiment of the invention will be described in principle in the following text, with reference to the drawing.

DETAILED DESCRIPTION

Figure 1:
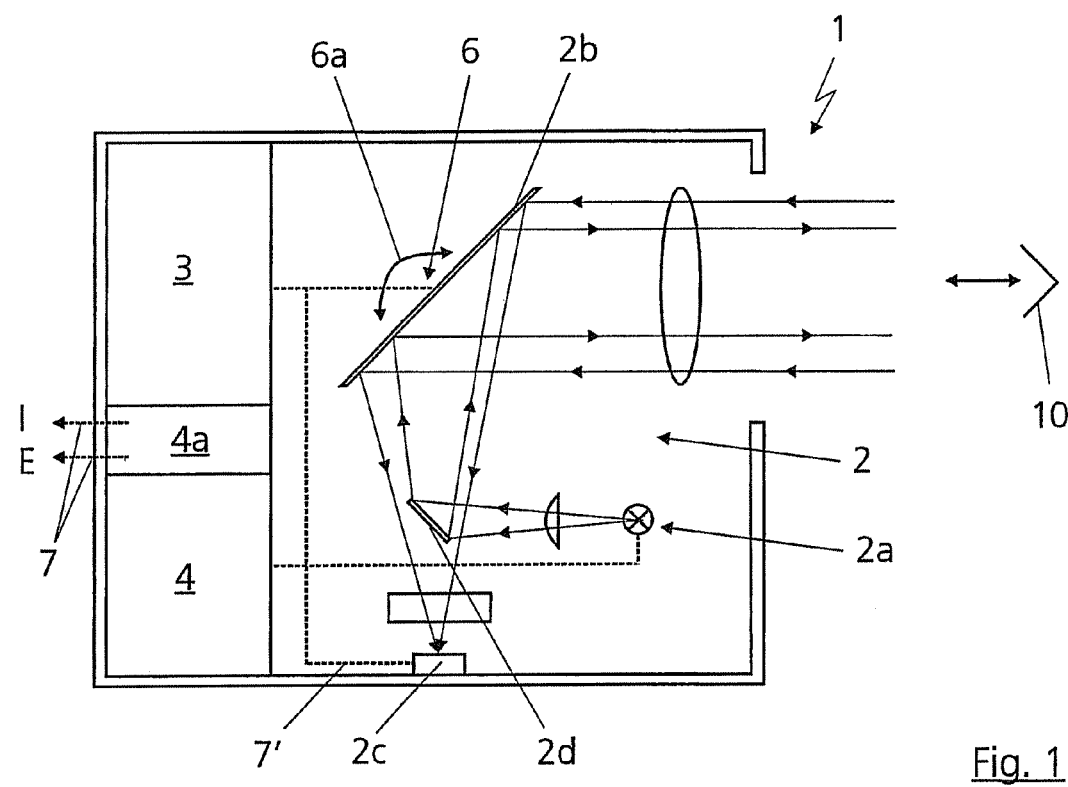
FIG. 1 shows an apparatus according to the invention, on an enlarged scale, schematically and in the form of a side view.

FIG. 1 shows an apparatus 1 according to the invention for detection of optical or optoelectronic objects or systems in a terrain area, which is not illustrated in any more detail.

The apparatus 1 is used as a scanning and/or identification device for detection of optical systems in the terrain area. For the purposes of the present application, the expression "optical system" means systems which can be located optically, for example enemy search or target systems, but in particular also including gunners, in particular snipers.

Figure 2:
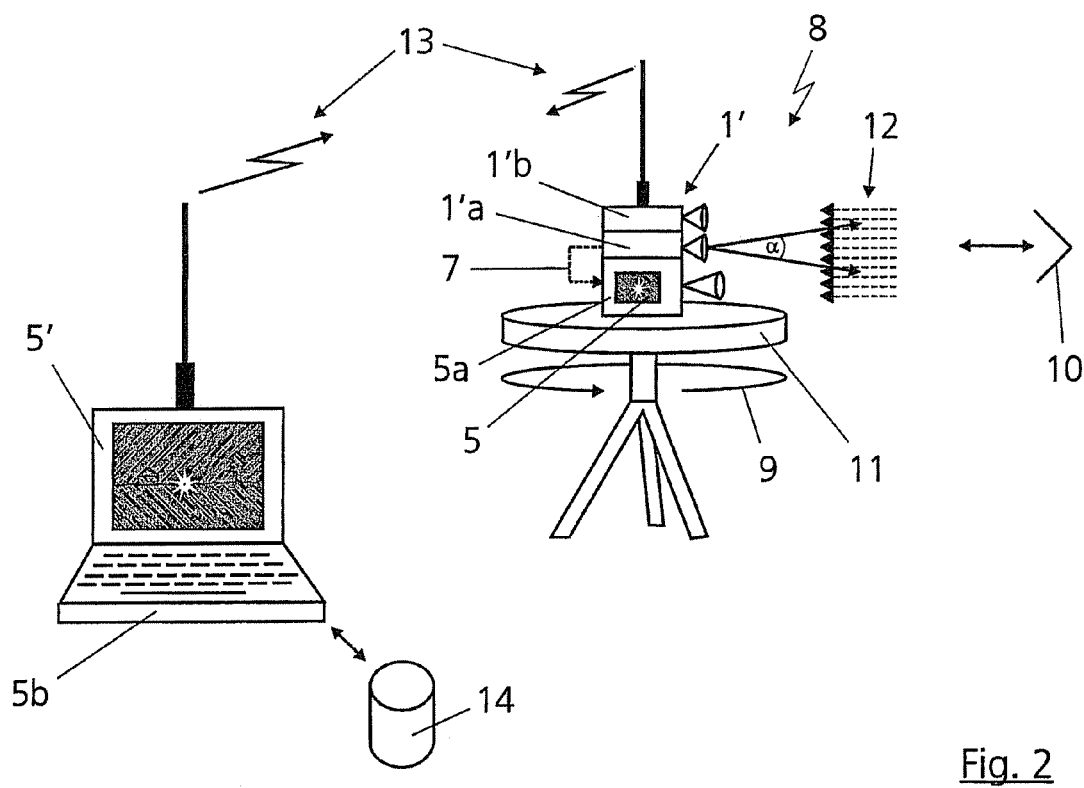
FIG. 2 shows a highly simplified schematic illustration of an automatic system for detection of optical systems, having the apparatus according to the invention.

An optical system 10 or a sniper 10 is indicated in highly simplified form or symbolically as a triple mirror in FIGS. 1 and 2, with this system or gunner being located in the terrain area and being aimed at by the apparatus 1, 1' according to the invention. In general terms, the reflecting element may be an optical system 10 with an (intermediate) image plane, on which a planar optical surface is arranged, which acts as a retroreflector. By way of example, this may be a telescopic sight of the sniper 10 on whose intermediate image plane a reticle is applied, on a plane-parallel glass plate. However, the reflecting element may even be the eye of the sniper 10.

In this case, the apparatus 1 has a laser arrangement 2 with a laser light source 2a, a moving mirror 2b for scanning the terrain area and a photoelement 2c for recording of retroreflected laser radiation from the laser light source 2a. The laser arrangement 2 and further advantageous refinements of the laser arrangement 2 have already been described in the prior DE 10 2005 006 726, and they will therefore not be described in detail in the following text. Furthermore, the apparatus 1 has a scan position sensor 3 for recording of an instantaneous scanning direction.

In addition, the apparatus 1 has a controller 4 for determination of the position of an optical system 10 to be detected, from a measurement (which is carried out by means of the laser arrangement 2) by evaluation of the intensity of retroreflected laser radiation from an optical surface of the optical system 10, and evaluation of the associated scanning direction recorded by the scan position sensor 3, with the controller 4 having an electronic interface 4a via which information relating to the intensity I and the elevation E of the recorded retroreflected laser radiation can be transmitted to a display apparatus 5, 5' (see FIG. 2).

As can also be seen from FIG. 1, the mirror is an oscillating mirror 2b. The oscillating mirror 2b can be scanned about an oscillation axis 6, which runs at right angles to the plane of the drawing in FIG. 1, that is to say it is horizontal, in the normal in-use position, as indicated by a double-headed arrow 6a.

When, in the course of a military operation, a user of the apparatus 1 approaches a terrain area in which it is believed enemy snipers may be located, then he looks at, the terrain in question through the display apparatus 5, by slowly scanning the apparatus 1 horizontally over the terrain area. The apparatus 1 checks the terrain area and supplies position information via the interface 4a, that is to say information about the intensity I and the elevation E of the recorded retroreflected laser radiation, that is to say the position of the sniper, as soon as a sniper such as this has been detected and located.

In the present exemplary embodiment, a digital camera 5a has the display apparatus 5. The apparatus 1 is electrically connected via the electronic interface 4a to the digital camera 5a (indicated in dashed lines by a line 7 in the figures). The field of view of the apparatus 1 and the field of view of the digital camera 5a at least approximately coincide. The information relating to the intensity I and the elevation E of the recorded retroreflected laser radiation from the optical system 10 to be detected is superimposed electronically on the output image of the display apparatus 5 of the digital camera 5a. As can be seen in FIG. 2, in the present exemplary embodiment, the apparatus 1 is mechanically connected to the digital camera 5a. In other exemplary embodiments, the digital camera 5a could also be connected to the apparatus 1 by non-mechanical means. In order to allow the information relating to the intensity I and the elevation E of the recorded retroreflected laser radiation from the optical system 10 to be detected to be electronically superimposed on the image on the digital camera 5a, the relative position of the apparatus 1 must, however, be known to the digital camera 5a, and the field of view of the apparatus 1 must likewise coincide with the field of view of the digital camera 5a.

As can also be seen from FIG. 1, the light beam from the laser light source 2a is guided by means of a deflection mirror 2d along an optical axis to the oscillating mirror 2b and from there to the terrain area and to the optical system 10. The light beam which is reflected from the optical system 10 to be detected is guided via the oscillating mirror 2b along the optical axis to the photoelement 2c. The photoelement 2c is connected to the controller 4 via a line 7'. In particular, the controller 4 contains a comparator (not illustrated), whose threshold value is set so as to allow a decision to be made between "normally" reflected light and the more intensive light reflected from the optical system 10. The controller 4 has a plurality of outputs which connect it via the line 7', for example, to an oscillating drive, which is not illustrated, for the oscillating mirror 2b, the scan position sensor 3 and the laser light source 2a.

In the present exemplary embodiment, the photoelement 2c is an InGaAs PIN diode. In further exemplary embodiments, other known photoelements 2c may, however, also be used. The laser light source 2a is an InGaAs laser diode. In other exemplary embodiments, of course, it is also possible to provide a different laser diode or, for example, a GaAs laser diode.

FIG. 2 shows an autonomous and automatic system 8 for detection of optical systems 10. For this purpose, the digital camera 5a, which has the display apparatus 5, is mechanically connected to a further embodiment of an apparatus 1' according to the invention. As can also be seen from FIG. 2, the apparatus 1' and the camera 5a are arranged on a scanning device 11 being pivotable about 360 degrees (indicated by the arrow 9). The apparatus 1' is coaxial. This is indicated by two separate parts 1'a and 1'b. The laser light source 2a is arranged in the first part 1'a of the apparatus 1' and its light beam is guided along a first optical axis to the terrain area (not shown in any more detail). In contrast, in the second part 1'b, the light beam which is reflected from the optical system 10 (indicated by arrows 12 in FIG. 2) is guided separately along a second optical axis to the photoelement 2c, which is not illustrated in any more detail in FIG. 2. As can be seen from FIG. 2, the apparatus 1' is pivotable horizontally about 360 degrees in the in-use position. In the case of the present exemplary embodiment, this means that the laser arrangement 2, the scan position sensor 3 and the display apparatus 5 of the digital camera 5a are scanned synchronously on a horizontal plane in order to scan the terrain area. The apparatus 1' can be used to scan through an elevation range a of about 6 to about 10 degrees. In order to cover greater elevations, the scanning device 11 could also be designed, in a further exemplary embodiment, such that it can be inclined.

The information relating to the intensity I and the elevation E of the recorded retroreflected laser radiation from the sniper 10 is superimposed on the image from the digital camera 5a (see the light spot, illustrated in an exaggerated size, in the central area of the display apparatus 5 of the digital camera 5a). The digital camera 5a may use any desired wavelength. In the present exemplary embodiment, the digital camera 5a is a thermal imager. This may preferably have a wavelength in the range from 8 to 12 μm.

As can also be seen from FIG. 2, the apparatus 1' and its controller 4 are connected via a wire-free link 13 (for example radio links, Bluetooth or the like) to a display computer 5b, which has a monitor as the display apparatus 5'. If the terrain area is continuously horizontally scanned, when a retroreflection from a sniper 10 is detected, its intensity I or strength and elevation E are transmitted from the apparatus 1' to the display computer 5b. As can also be seen in FIG. 2 this can be displayed on the display apparatus 5', and superimposed on an image of the terrain area (see the light spot in the central area of the monitor 5'). The corresponding control software emits an alarm and displays the image on the display apparatus 5'. If the displayed retroreflection does not relate to a threat from a sniper 10, an operator can acknowledge it. A decision is therefore made as to whether the displayed image (elevation and azimuth) relates to an optical system 10 to be detected, in particular a sniper, and this is stored in a database 14. When the same surrounding area or the same terrain area is scanned repeatedly, another false alarm, if appropriate, can thus be suppressed in a particularly advantageous manner by comparison with a database.

What is claimed is:

1. An apparatus for detection of optical systems in a terrain area, having at least:
    a laser arrangement with a laser light source, a moving mirror for scanning the terrain area and a photoelement for detection of retroreflected laser radiation from the laser light source,
    a scan position sensor for detection of a scanning direction,
    a controller for determination of the position of an optical system to be detected, from a measurement which is carried out by means of said laser arrangement by evaluation of the intensity of retroreflected laser radiation from an optical surface of the optical system, and evaluation of the associated scanning direction detected by said scan position sensor, with the controller having an electronic interface via which information relating at least to the intensity and the elevation of the detected retroreflected laser radiation can be transmitted to at least one display apparatus, and
    a digital camera for forming an image of at least a portion of the terrain area, said digital camera being operably coupled to said display apparatus such that said image and the information relating to the intensity and elevation are both displayed on the display apparatus such that the information and the image are superimposed.

2. An apparatus according to claim 1, wherein said digital camera is mechanically connected to said laser arrangement.

3. An apparatus according to claim 1, in which the relative position of the apparatus with respect to said digital camera is known.

4. An apparatus according to claim 1, wherein said mirror is an oscillating mirror being pivotable about an oscillation axis.

5. An apparatus according to claim 4, wherein said oscillation axis of said oscillating mirror is a horizontal axis when the apparatus is in the in-use position.

6. An apparatus according to claim 1, wherein said laser arrangement is mounted for substantially 360° rotation about a horizontal axis.

7. An apparatus according to claim 1, wherein the light beam from said laser light source is guided along an optical axis to said mirror and from there to the terrain area, and wherein the light beam which is reflected from the optical system to be detected is guided via said mirror along the optical axis to said photoelement.

8. An apparatus according to claim 1, wherein the light beam from said laser light source is guided along a first optical axis to the terrain area, and wherein the light beam which is reflected from the optical system to be detected is guided separately along a second optical axis to said photoelement.

9. An apparatus according to claim 1, wherein said photoelement is a PIN diode.

10. An apparatus according to claim 1, wherein said photoelement is an InGaAs PIN diode.

11. An apparatus according to claim 1, wherein said laser light source is a laser diode.

12. An apparatus according to claim 1, wherein said laser light source is an InGaAs laser diode or a GaAs laser diode.

13. An apparatus according to claim 1, further comprising a display computer wireless coupled to the controller.

14. A method for detection of optical systems in a terrain area, comprising the steps of:

optically scanning the terrain area by means of a moving mirror, determining the position of the optical system to be detected from a measurement which is carried out by means of a laser arrangement by evaluation of the intensity of retroreflected laser radiation from an optical surface of the optical system, and evaluation of an associated scanning direction detected by a scan position sensor, transmitting information relating at least to the intensity and the elevation of the recorded retroreflected laser radiation via an interface to at least one display apparatus, and forming an image of at least a portion of the terrain area, and displaying said image and said information such that one appears superimposed upon the other.

15. A method according to claim 14, wherein said moving mirror is pivotable about an oscillation axis.

16. A method according to claim 14, wherein said laser arrangement, said scan position sensor and said display apparatus are pivoted synchronously on a horizontal plane in order to scan the terrain area.

17. A method according to claim 14, wherein an alarm signal is emitted when a potential optical system is detected during continuous horizontal scanning of the terrain area with a decision on whether the displayed image is an optical system to be detected being made and being stored in a database.

18. The apparatus of claim 1 wherein said intensity and elevation information are displayed as a spot of light superimposed on the image of the terrain.

19. The method of claim 14 wherein said intensity and elevation information are displayed as a spot of light superimposed on the image of the terrain.

* * * * *